United States Patent
Busch

(10) Patent No.: US 7,279,864 B2
(45) Date of Patent: Oct. 9, 2007

(54) CONTROL UNIT FOR DRIVING A REGULATING TRANSISTOR OF A FAN ARRANGEMENT

(75) Inventor: Peter Busch, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 702 days.

(21) Appl. No.: 10/834,756

(22) Filed: Apr. 29, 2004

(65) Prior Publication Data
US 2004/0265115 A1 Dec. 30, 2004

(30) Foreign Application Priority Data
Apr. 30, 2003 (DE) .................. 103 19 557

(51) Int. Cl.
| | |
|---|---|
| H02P 1/26 | (2006.01) |
| H02P 1/42 | (2006.01) |
| H02P 3/18 | (2006.01) |
| H02P 23/00 | (2006.01) |
| H02P 25/00 | (2006.01) |

(52) U.S. Cl. ............... 318/772; 318/632; 318/459; 318/479; 318/504; 318/268; 318/254; 318/138

(58) Field of Classification Search ............ 318/459, 318/479, 504, 268, 254, 138
See application file for complete search history.

(56) References Cited

U.S. PATENT DOCUMENTS

| | | | |
|---|---|---|---|
| 4,097,789 A | 6/1978 | Doemen | |
| 5,220,634 A * | 6/1993 | Yaguchi et al. | 388/819 |
| 6,274,991 B1 | 8/2001 | Busch | |
| 7,166,976 B2 * | 1/2007 | Buerk et al. | 318/268 |

FOREIGN PATENT DOCUMENTS

| | | |
|---|---|---|
| DE | 23 38 215 | 2/1975 |
| DE | 44 08 442 A1 | 9/1995 |
| DE | 44 44 810 A1 | 6/1996 |
| DE | 198 37 014 C1 | 11/1999 |
| DE | 100 40 440 A1 | 3/2002 |
| WO | WO 01/59921 A1 | 12/2000 |
| WO | WO 03/103129 A1 | 12/2003 |

* cited by examiner

Primary Examiner—Lincoln Donovan
Assistant Examiner—Erick Glass
(74) Attorney, Agent, or Firm—Cohen Pontani Lieberman & Pavane LLP

(57) ABSTRACT

A control unit for driving a regulating transistor (2) of a fan arrangement, in which the regulating transistor (2) is connected in series with an electronically commutated fan (1), having control means (5, 6, R1, R2) for the analog driving of the regulating transistor (2) with a control signal ($U_{control}$) in a manner dependent on a control input voltage ($U_{in}$). The control unit comprises compensation means (R3, R4) for influencing the control signal ($U_{control}$) in a manner dependent on an AC voltage component ($U_{AC}$) of an operating voltage ($U_B$) of the fan arrangement, so that the AC voltage component ($U_{AC}$) of the operating voltage ($U_B$) is completely or partially compensated for in a voltage across the fan (1).

16 Claims, 2 Drawing Sheets

CONTROL UNIT FOR DRIVING A REGULATING TRANSISTOR OF A FAN ARRANGEMENT

RELATED APPLICATION

This patent application claims the priority of German Patent Application 103 19 557.2, the disclosure content of which is hereby incorporated by reference.

FIELD OF THE INVENTION

The invention relates to a control unit for driving a regulating transistor of a fan arrangement, in which the regulating transistor is connected in series with an electronically commutated fan, having control means for the analog driving of the regulating transistor with a control signal in a manner dependent on a control input voltage.

BACKGROUND OF THE INVENTION

Fan arrangements, in particular for computers, frequently have such a control unit in order to be able to control the rotational speed of the fan. A high fan rotational speed is associated with a high noise level, which many users find disturbing. Therefore, in high-quality computers, it is customary to adapt the rotational speed of the fan to the respective cooling requirement. In phases of low loading, a computer generates little heat and only a low cooling capacity is necessary, with the result that the fan can be operated with a low rotational speed.

The fan is controlled by the regulating transistor connected in series, which makes it possible to set the voltage present across the fan. The circuit principle employed is illustrated in FIG. 2, where a fan 1, a regulating transistor 2 and a current measuring resistor 3 are connected in series between terminals of an operating voltage $U_B$. The current measuring resistor 3 has a very small value and may serve, in the case of electronically commutated fans, to detect the fan current and to determine the fan rotational speed therefrom on the basis of the commutation pulses contained therein.

The regulating transistor 2 makes it possible to influence the voltage across the fan 1 in a simple manner. A control unit 4 is provided for driving the regulating transistor 2. The voltage drop across the regulating transistor 2 and thus the voltage across the fan 1 change depending on the driving effected by the control unit 4. In the case illustrated, the regulating transistor 2 is operated as a voltage follower, that is to say the voltage at the emitter is defined by the voltage at the base and also the base-emitter voltage. This circuit is cited as representative of other circuit principles that can be realized in connection with a regulating transistor.

A concrete realization of a control unit from the prior art is shown in FIG. 3, where the control unit 4 comprises a control transistor 5 driven by an operational amplifier 6. A control input voltage $U_{in}$ is applied to the inverting input of the operational amplifier 6. Depending on the magnitude of the control input voltage $U_{in}$, the control transistor 5 is turned on to a greater or lesser extent, thereby changing the voltage $U_{control}$ at a control output 7 of the control unit 4. The control input voltage $U_{in}$ is generated by a rotational speed detection circuit 8 connected to the current measuring resistor 3. Such a rotational speed detection circuit 8 is disclosed in U.S. Pat. Nos. 4,097,789, 6,274,991 and WO 03/103129 A1. The content of each of these documents is hereby incorporated herein by reference.

In order to achieve a reliable rotational speed regulation of a fan 1, it is of great importance that the rotational speed detection circuit 8 can reliably identify the commutation pulses of the fan motor 1. What is problematic in the case of circuits according to the prior art, however, is that fluctuations may occur in the operating voltage $U_B$, that is to say the operating voltage $U_B$ is composed of a DC voltage component $U_{GL}$ and an AC voltage component $U_{AC}$. The AC voltage component $U_{AC}$ may have a similar frequency to the commutation operations, with the result that an erroneous identification of fan pulses may occur if said AC voltage component affects the current through the current measuring resistor. An abrupt fluctuation in the operating voltage will occur whenever other loads on the same power supply unit generate sudden load changes such as, by way of example, hard disks or processors with an activated power-saving function.

In order to solve this problem, it is known to provide a separate passive filtering of the operating voltage of the fan by means of inductor coils and capacitors. What is disadvantageous is that both components have to be given comparatively large dimensions and high additional costs thus arise.

In another solution to the problem, in order to identify commutations, current fluctuations of the fan are detected as a percentage and compared with a differential percentage which is greater than the percentage fluctuation of the operating voltage. In other words, if the operating voltage can fluctuate for example by ±5% and the identification threshold for a fan commutation is ±15%, for example, it can initially be assumed that no erroneous identification can occur.

In the case of this method, however, an erroneous identification of commutation pulses can nevertheless occur if the fan is operated with a reduced operating voltage. This can be seen upon consideration of the circuit according to the prior art in accordance with FIGS. 2 and 3, in which the regulating transistor 2 feeds a stabilized regulating voltage to the fan. While the fluctuating operating voltage is present at one terminal of the fan 1, a stabilized voltage is fed to the other terminal of the fan 1. Accordingly, the voltage across the fan 1 also fluctuates and a correspondingly fluctuating current flow through the fan 1 occurs. This fluctuating current is tapped off as a voltage across the current measuring resistor 3 and fed to the rotational speed detection circuit 8. This has the effect that a fluctuation in the operating voltage may lead to an erroneous identification. A commutation pulse is thus identified even though such a pulse is not present, but rather an interference voltage which has been caused for example by the activation of a processor in the power-saving mode.

The magnitude of the voltage fluctuations can be determined by means of the following calculation, a customary circuit in accordance with FIG. 3 being taken as a basis, in which the control voltage $U_{control}$ is generated by an N-MOS transistor in an open-drain configuration and an operational amplifier. The fan voltage results as $$U_{fan} = U_{GL} + U_{AC} + U_{BE} - U_{control}$$

in which case $U_{control} = U_{in} * (R1+R2)/R2$ holds true where $U_{GL}$=DC voltage component of the operating voltage, $U_{AC}$=AC voltage component of the operating voltage, $U_{BE}$=base-emitter voltage of the regulating transistor 2, and $U_{control}$=stabilized regulating voltage.

Although the stabilized regulating voltage is variable for the rotational speed regulation of the fan, what is involved is a comparatively slow voltage change with a time constant typically lying in the region of 100 ms. By contrast, the time constant of commutation pulses is typically 1 ms.

If it is assumed in a computational example that $U_{GL}=12$ V, $U_{AC}=\pm 0.5$ V, $U_{BE}=-0.7$ V and $U_{control}=8$ V, the following is obtained for the voltage across the fan $$U_{fan} = 12 \text{ V} \pm 0.5 \text{ V} - 0.7 \text{ V} - 8 \text{ V}$$
$$= 3.3 \text{ V} \pm 0.5 \text{ V}$$
$$= 3.3 \text{ V} \pm 15\%.$$

Despite an operating voltage fluctuation of just ±5%, the fan voltage accordingly fluctuates by ±15%, given an ohmic behavior of the fan, current fluctuations of ±15% would now be expected, so that the voltage at the current measuring resistor 3 also fluctuates by ±15%.

A further problem is posed by the nonlinear behavior of the internal fan electronics of commercially available fans. The switch-on/off threshold of such a typical fan is at an operating voltage of 3 V, that is to say that the current fluctuations may be much more than ±15%, specifically if, in the worst case, the fan continually switches on and off. The rotational speed detection circuit 8 then incorrectly interprets this switching on and off as a current fluctuation which has been caused by a commutation of the fan.

SUMMARY OF THE INVENTION

One object of the invention is to provide a control unit for a fan arrangement in which fluctuations in the operating voltage do not have the effect that commutation pulses are incorrectly identified by a rotational speed detection circuit.

This and other objects are attained in accordance with one aspect of the invention directed to a control unit for driving a regulating transistor of a fan arrangement powered by an operating voltage, in which the regulating transistor is connected in series with an electronically commutated fan, having control means for analog driving of the regulating transistor with a control signal in a manner dependent on a control input voltage. A compensation means changes the control signal based on an AC voltage component of the operating voltage of the fan arrangement, so that the AC voltage component of the operating voltage is at least partially compensated for in a voltage across the fan.

By means of the configuration of a control unit according to an embodiment of the invention, the control signal is tracked in accordance with the AC voltage component of the operating voltage. Thus, if the operating voltage increases by 5%, for example, the regulating transistor is driven in such a way that the voltage thereby also increases at the other terminal of the fan, in the most favorable case by the same voltage magnitude, with the result that overall the voltage across the fan remains constant.

In one configuration, the compensation means utilize an operational amplifier, the control input voltage being passed to one input and the operating voltage being passed to the other input. Such a circuit manages without a capacitor and can, therefore, be used in a simple manner in an integrated circuit.

In a concrete configuration, the operating voltage is fed via a voltage divider to the inverting input of the operational amplifier, and the control input voltage is fed to the noninverting input. In this case the operational amplifier drives a control transistor, which determines the magnitude of the control signal provided at a control output of the circuit for the driving of the regulating transistor.

DETAILED DESCRIPTION OF THE DRAWINGS

Figure 1:
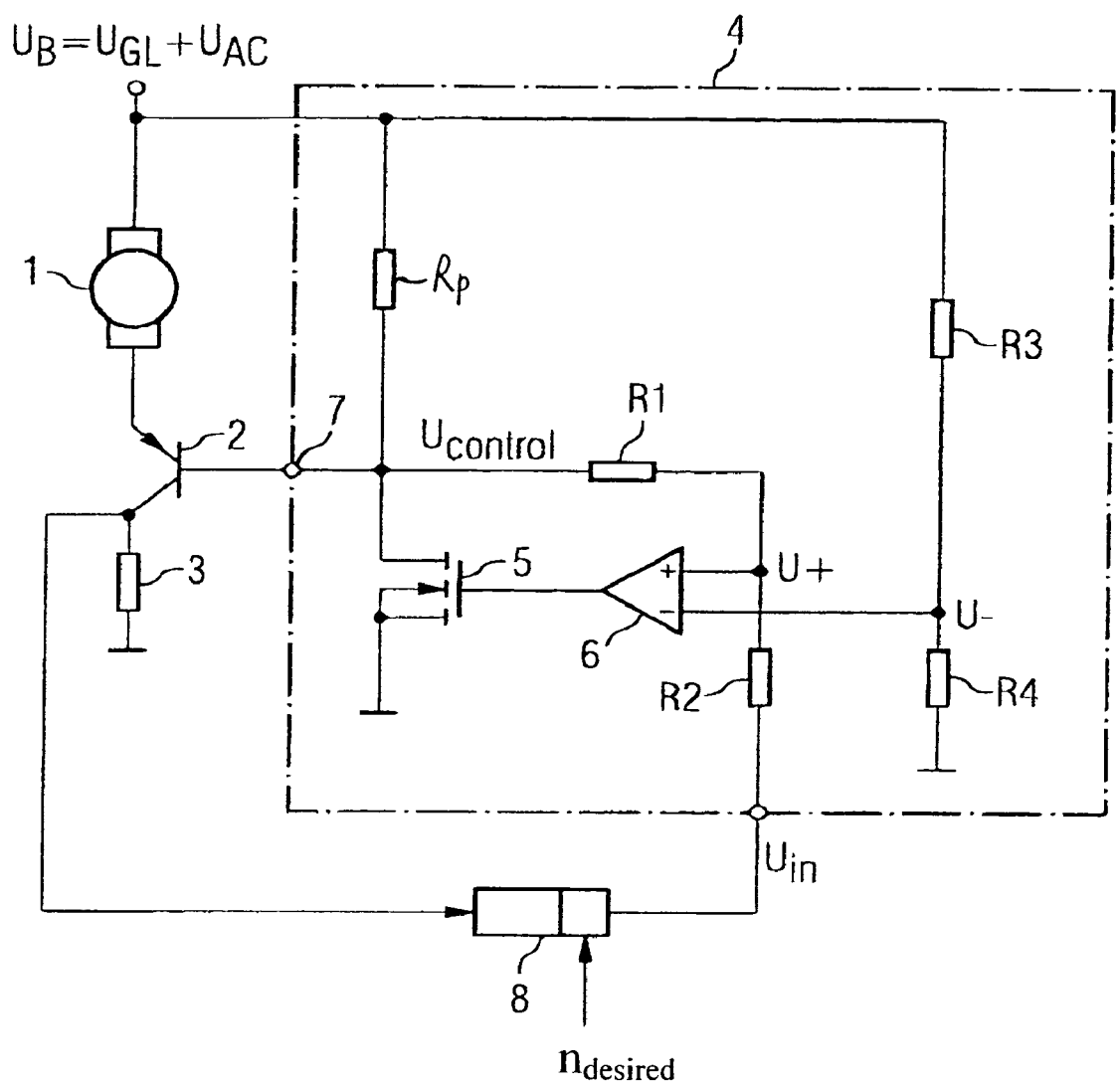
FIG. 1 shows an exemplary embodiment of a fan arrangement with a control unit according to the invention.
Figure 2:
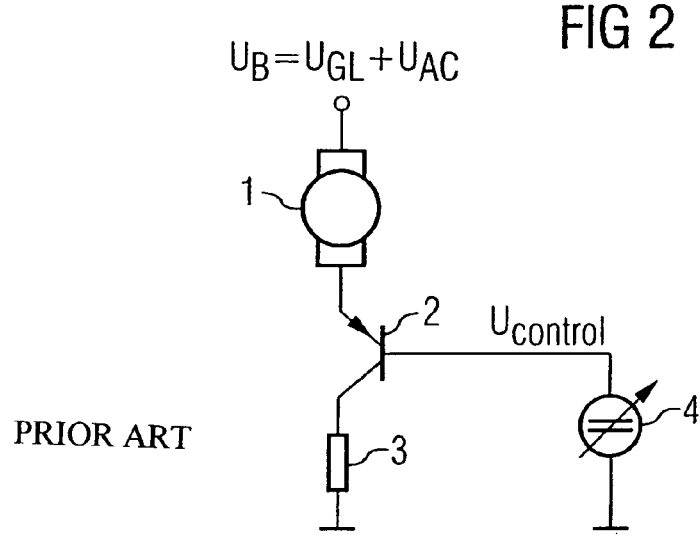
FIGS. 2 and 3 show circuit arrangements from the prior art.
Figure 3:
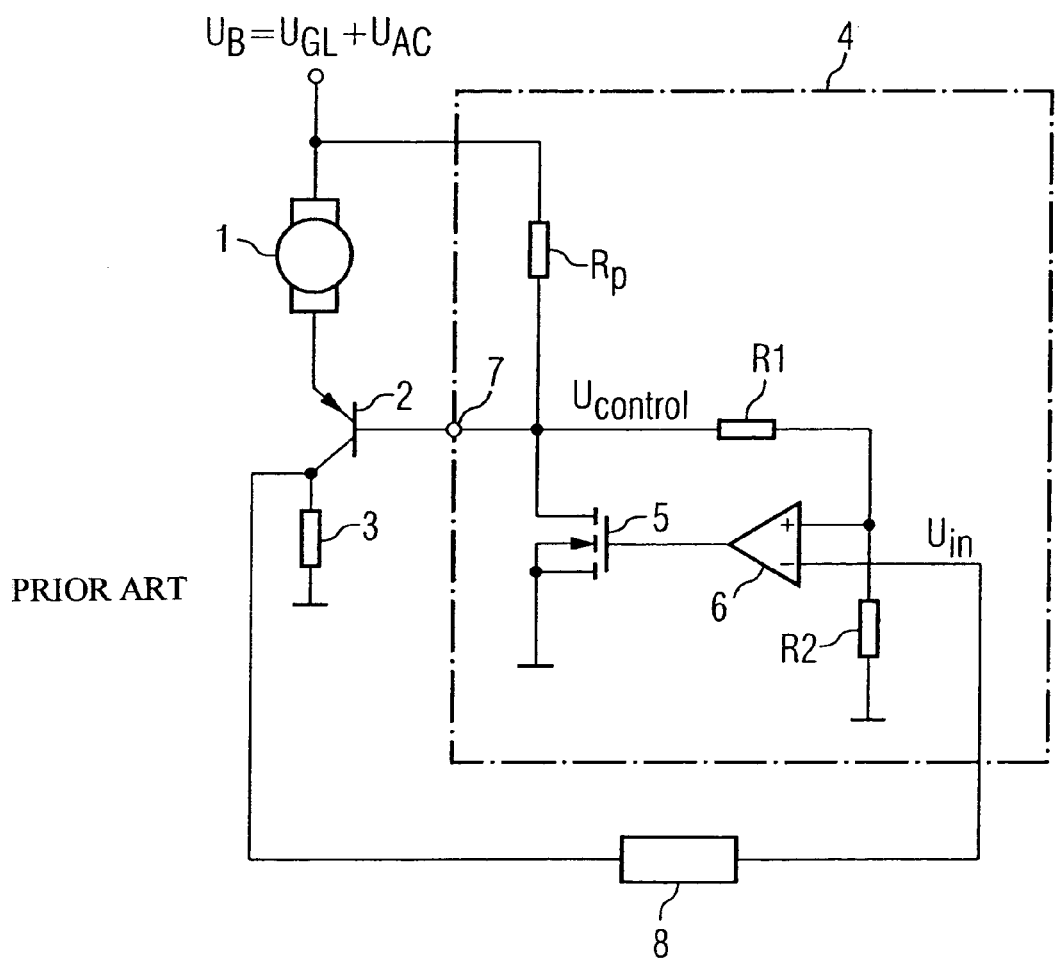

FIG. 1 shows a fan arrangement having a fan 1, a regulating transistor 2 and a current measuring resistor 3, which are connected in series and are connected to an operating voltage $U_B$. The regulating transistor 2 is driven by a control unit 4 according to the invention. Moreover, a rotational speed detection circuit 8 is provided, such as one of the known rotational speed detection circuits mentioned above, which, on the one hand, is connected to the current measuring resistor 3 and, on the other hand, provides the control input voltage $U_{in}$ for the control unit 4. As explained above, fluctuations may occur in the operating voltage, with the result that a voltage $U_B = U_{GL} + U_{AC}$, which may be greater or less than the nominal operating voltage $U_{GL}$, is present across the arrangement comprising the fan 1, the regulating transistor 2 and the current measuring resistor 3. This fluctuating operating voltage is fed to the inverting input of an operational amplifier 6 via a voltage divider having resistors R3 and R4. The control input voltage $U_{in}$ generated by the rotational speed detection circuit 8 is fed to the noninverting input of the operational amplifier 6.

The output of the operational amplifier 6 is connected to the gate terminal of an N-MOS transistor 5. The latter is connected, on the one hand, to ground and, on the other hand, to a control output 7 of the control unit 4, said control output being provided for the connection of the control input of the regulating transistor 2. A first resistor R1 is arranged between the control output 7 and the noninverting input of the operational amplifier 6. Moreover, the noninverting input is connected to a second resistor R2, to which the control input voltage $U_{in}$ is applied. An additional resistor $R_p$ is connected to the control output 7 and the operating voltage. It serves as a pull-up resistor for the output transistor.

The control unit 4 according to the invention realizes two regulating circuits. A first regulating circuit is formed by the detection of the rotational speed and also a corresponding generation of a control signal $U_{control}$, by means of which the regulating transistor 2 is driven. The actual rotational speed determined by the rotational speed detection circuit 8 is compared with an inputted desired rotational speed $n_{desired}$. A control input voltage $U_{in}$, which is dependent on the deviation between the desired speed and the actual speed, is generated by circuit 8 as an input to control unit 4. The time constant of this first regulating circuit is comparatively large and typically lies in the region of several hundred ms. A faster regulation is not necessary since the temperature of an apparatus to be cooled also changes only comparatively slowly.

A second regulating circuit is formed by virtue of the fact that the substantially faster voltage fluctuations by virtue of the AC voltage component $U_{AC}$ in the operating voltage $U_B$ are passed to the operational amplifier 6 via the voltage divider having the third and fourth resistors R3 and R4. This results in an additional input variable for the determination of the control signal $U_{control}$.

During normal operation, that is to say if no AC voltages are superposed, an excessively low actual rotational speed effects a reduction in the control input voltage $U_{in}$. The output voltage of the operational amplifier 6 also decreases as a result. The control signal $U_{control}$, with which the regulating transistor 2 is driven, is correspondingly reduced. On account of the lower base voltage at the transistor 2, the emitter voltage also decreases since a voltage follower is involved. A higher value results for the voltage across the fan 1, however, since the operating voltage $U_B$ at the other terminal of the fan 1 remains the same. The fan accordingly rotates faster, which is detected at the current measuring resistor 3.

Although fast changes in the operating voltage by virtue of the AC voltage component $U_{AC}$ do not significantly alter the rotational speed of the fan 1 by means of the regulating mechanism described, a momentary increase in the voltage across the fan 1 may occur, which leads to a higher current through the fan 1 and thus also through the current measuring resistor 3, which may ultimately lead to an erroneous identification of a commutation pulse, as a result of which a higher rotational speed than is actually present is identified.

The control unit 4 according to the invention prevents this by the operating voltage being fed to the inverting input of the operational amplifier 6 via the voltage divider having the resistors R3 and R4. A momentary increase in the operating voltage leads to a reduction of the output voltage of the operational amplifier 6. Therefore, the control signal $U_{control}$, increases, which leads to an increase in the voltage at the emitter of the regulating transistor 2 and thus to an increase in the voltage at the lower terminal of the fan 1. The voltage across the fan 1 thus remains the same. The current through the fan 1 and the current measuring resistor 3 correspondingly remains the same. An erroneous identification of a commutation pulse by the rotational speed detection circuit 8 is thus precluded.

Depending on the dimensioning of the resistors R1, R2, R3 and R4, the result is a complete or partial compensation of the fluctuations in the operating voltage. The way in which a complete compensation of the operating voltage fluctuations can be achieved is shown computationally below. The following results for the voltage across the fans:

$$U_{fan}=U_{GL}+U_{AC}+U_{BE}-U_{control}. \quad (I)$$

Since the voltage U+ at the noninverting input of the operational amplifier 6 is equal to the voltage U− at the inverting input of the operational amplifier 6, the following results $$(U_{control}-U_{in})*R2/(R1+R2)+U_{in}=(U_{GL}+U_{AC})*R4/(R3+R4). \quad (II)$$

If the ratio R1/R2=R3/R4 is then chosen, R2/(R1+R2)= R4/(R3+R4)= a also holds true and the following results after rearrangement of the equation $$(U_{control}-U_{in})*a+U_{in}=(U_{GL}+U_{AC})*a$$

$$U_{control}*a+U_{in}*(1-a)=U_{GL}*a+U_{AC}*a$$

$$U_{control}=U_{GL}+U_{AC}-U_{in}*(1-a)/a.$$

Inserted into the fan equation (I) the following results $$U_{fan} = U_{GL} + U_{AC} + U_{BE} - (U_{GL} + U_{AC} - U_{in} *(1-a)/a)$$

$$= U_{in} *(1-a)/a + U_{BE}.$$

It is thus shown that, given the above-mentioned choice of resistance ratios, the fan voltage is independent of the operating voltage within the regulating range of the circuit, to be precise independently both of the DC voltage component $U_{GL}$ and of the AC voltage component $U_{AC}$. Only the control input voltage $U_{in}$ is critical. Consequently, the problem of erroneous identifications of commutation pulses brought about by operating voltage fluctuations is eliminated.

The invention is not restricted by the description of the invention on the basis of the exemplary embodiments. Rather, the invention encompasses any new feature and also any combination of features, which comprises in particular any combination of features in the patent claims, even if this combination is not explicitly specified in the patent claims.

I claim:

1. In a control unit for driving a regulating transistor of a fan arrangement powered by an operating voltage, in which the regulating transistor is connected in series with an electronically commutated fan, having control means for analog driving of the regulating transistor with a control signal in a manner dependent on a control input voltage, the improvement comprising:

compensation means for changing the control signal based on an AC voltage component of the operating voltage of the fan arrangement, so that the AC voltage component of the operating voltage is at least partially compensated for in a voltage across the fan.

2. The control unit as claimed in claim 1, wherein the compensation means interact with an operational amplifier, the control input voltage being passed to one input and the operating voltage being passed to the other input.

3. The control unit as claimed in claim 2, wherein the operating voltage is passed to the other input via a voltage divider having a third and fourth resistor.

4. The control unit as claimed in claim 1, wherein a control transistor is provided and is connected to a control output for the driving of the regulating transistor.

5. The control unit as claimed in claim 4, wherein the control transistor, for its driving, is connected to the output of an operational amplifier.

6. The control unit as claimed in claim 5, wherein the control output is connected to the control transistor and, via a first resistor, to one input of the operational amplifier and said one input is additionally connected to a second resistor, for receiving the control input voltage.

7. The control unit as claimed in claim 1, wherein an increase in the control input voltage effects a reduction of the fan rotational speed.

8. The control unit as claimed in claim 4, wherein an increase in the control input voltage effects a reduction of the fan rotational speed.

9. The control unit as claimed in claim 3, wherein the control output is connected to the control transistor and, via a first resistor, to one input of an operational amplifier and said one input is additionally connected to a second resistor, for receiving the control input voltage; and wherein the ratio of the first to the second resistor is equal to the ratio of the third to the fourth resistor.

10. The control unit as claimed in claim 1, wherein the control unit is formed as an integrated circuit.

11. A fan arrangement having
   terminals for feeding in an operating voltage,
   an electronically commutated fan and
   a regulating transistor connected in series with the latter,
      featuring a control unit as claimed in claim 1.

12. The fan arrangement as claimed in claim 11, wherein a rotational speed detection circuit is provided, which evaluates changes in the fan current caused by commutations of the fan, carries out a desired value comparison and, for the purpose of regulating the fan rotational speed, applies a control input voltage to the control means for driving the regulating transistor.

13. The fan arrangement as claimed in claim 12, wherein the rotational speed detection circuit is connected to a current measuring resistor arranged in the current path of the fan.

14. The fan arrangement as claimed in claim 11, wherein the fan is connected between the operating voltage and the regulating transistor, which feeds a regulated voltage to the fan.

15. The fan arrangement as claimed in claim 12, wherein the fan is connected between the operating voltage and the regulating transistor, which feeds a regulated voltage to the fan.

16. The fan arrangement as claimed in claim 15, wherein the regulating transistor is connected as a voltage follower.

* * * * *